(12) United States Patent
Hamann et al.

(10) Patent No.: US 6,233,206 B1
(45) Date of Patent: May 15, 2001

(54) HIGH DENSITY MAGNETIC THERMAL RECORDING AND REPRODUCING ASSEMBLY

(75) Inventors: Hendrik F. Hamann, Mohegan Lake; Yves Martin, Ossining; Hemantha Kumar Wickramasinghe, Chappaqua, all of NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/427,169

(22) Filed: Oct. 26, 1999

(51) Int. Cl.$^7$ ........................................ G11B 11/00
(52) U.S. Cl. .................. 369/13; 360/59; 369/126
(58) Field of Search ................ 369/13, 14, 126, 369/58; 360/59, 114

(56) References Cited

U.S. PATENT DOCUMENTS

| | | | |
|---|---|---|---|
| 3,716,845 | * 2/1973 | Chaffin, III | 365/120 |
| 4,343,993 | * 8/1982 | Binnig et al. | 250/306 |
| 4,731,773 | * 3/1988 | Lewkowicz | 369/59 |
| 4,747,698 | * 5/1988 | Wickramasinghe | 374/6 |
| 4,853,810 | * 8/1989 | Pohl et al. | 360/103 |
| 5,054,936 | * 10/1991 | Fraden | 374/164 |
| 5,130,866 | * 7/1992 | Klaassen et al. | 360/75 |
| 5,329,122 | * 7/1994 | Sakai et al. | 250/306 |
| 5,353,268 | * 10/1994 | Hintz | 369/13 |
| 5,391,871 | * 2/1995 | Matsuda et al. | 250/306 |
| 5,412,597 | * 5/1995 | Miyazaki et al. | 369/126 |
| 5,481,527 | * 1/1996 | Kasanuki et al. | 369/126 |
| 5,602,820 | * 2/1997 | Wickramasinghe | 369/169 |
| 5,650,887 | * 7/1997 | Dovek et al. | 360/75 |
| 5,732,053 | * 3/1998 | Yano et al. | 369/54 |
| 5,986,978 | 11/1999 | Rottmayer et al. | |
| 6,052,249 | * 4/2000 | Abraham et al. | 360/59 |

* cited by examiner

Primary Examiner—Tan Dinh
(74) Attorney, Agent, or Firm—Stephen C. Kaufman (57) ABSTRACT

The assembly of the present invention preferably writes by way of thermal near-field coupling between a thermal heater and a media. The thermal heater may comprise an atomic force microscope probe or a magnetic force microscope; and, preferably reads by way of a local magnetic sensor preferably comprising a magnetic force microscope which can yield spatial resolutions down to e.g., 250 Å.

19 Claims, 8 Drawing Sheets

HIGH DENSITY MAGNETIC THERMAL RECORDING AND REPRODUCING ASSEMBLY

CROSS-REFERENCE TO RELATED APPLICATION

The instant application is related to U.S. application Ser. No. 09/408,946 filed Sep. 30, 1999 by Wickramasinghe et al, which last application is co-pending, commonly assigned, and incorporated by reference herein.

INTRODUCTION TO THE INVENTION

The instant invention and application build upon concepts and apparatus disclosed in the cross-referenced application. A centerpiece of this cross-referenced application is the promulgation of a novel apparatus for writing/erasing high-density data on a digital recording media as a series of tags comprising a magnetic information bit pattern, the apparatus comprising:

1) a source of thermal radiation for generating an incident wave to the media;
2) means for applying a magnetic bias field on the digital recording media; and
3) means for coordinating a mutual positioning of the incident wave and the media for inducing a direct thermal coupling therebetween; the apparatus capable of writing/erasing said high-density data by at least one of the following actions:
    i) using an information signal for modulating the magnetic bias field;
    ii) using an information signal for modulating the power of the incident thermal wave to the media.

This apparatus for writing/erasing can realize important advantages, including providing data storage densities greater than that of diffraction limited systems, for example, data storage densities of approximately greater than 100 Gbit/inch$^2$, and writing speeds approximately greater than 100 MHz. A preferred embodiment of this apparatus features a novel thermal near-field heater, especially configured for operation in a substantially thermal near-field mode.

SUMMARY OF THE INVENTION

As noted above, the present invention builds upon the just defined apparatus for writing/erasing, by adding to it, and incorporating within it, a read capability. This is a significant addition, for the following reasons.

First of all, the writer/reader of the present invention can realize a dual and independent capability or functionality, namely, a writer and/or a reader, and this, either sequentially or simultaneously.

Second, the writer/reader of the present invention can provide a simple and complete solution for testing magnetic recording, for example (and most profoundly), on the nanometer scale. To restate this last critical advantage—we know of no present technology, with particular reference to hard magnetic materials, which can enable the study of their properties on a nanometer scale.

Accordingly, we now disclose a novel assembly for writing/reading high density data on a recording media as a series of tags comprising a magnetic information bit pattern, the assembly comprising:

1) a magnetic bias field generator for applying a magnetic bias field on the media;
2) a thermal heater for generating and directing an incident thermal wave to the media;
3) a first controller for coordinating a mutual position of the incident thermal wave and the media for inducing a direct thermal coupling therebetween;
4) a magnetic sensor capable of reading written data on the media; and
5) a second controller for coordinating a mutual positioning of the magnetic sensor and the media; the assembly acting as a reader by operating the second controller; the assembly acting as a writer by operating the first controller and realizing at least one of the following actions;
    i) using an information signal for modulating the magnetic bias field;
    ii) using an information signal for modulating the power of the incident thermal wave to the media.

BRIEF DESCRIPTION OF THE DRAWINGS

The invention is illustrated in the accompanying drawing (not drawn to scale), in which.

DETAILED DESCRIPTION OF THE INVENTION

The detailed description of the invention unfolds by disclosing a generalized (FIG. 1) as well as a more specific (FIG. 6) illustrative assembly of the present invention, the detailed description turning attention sequentially to subsumed elements of the generalized assembly, with attention being especially concentrated on preferred or alternative embodiments of the subsumed elements (FIGS. 2–5).

Overview of Assembly

Figure 1:
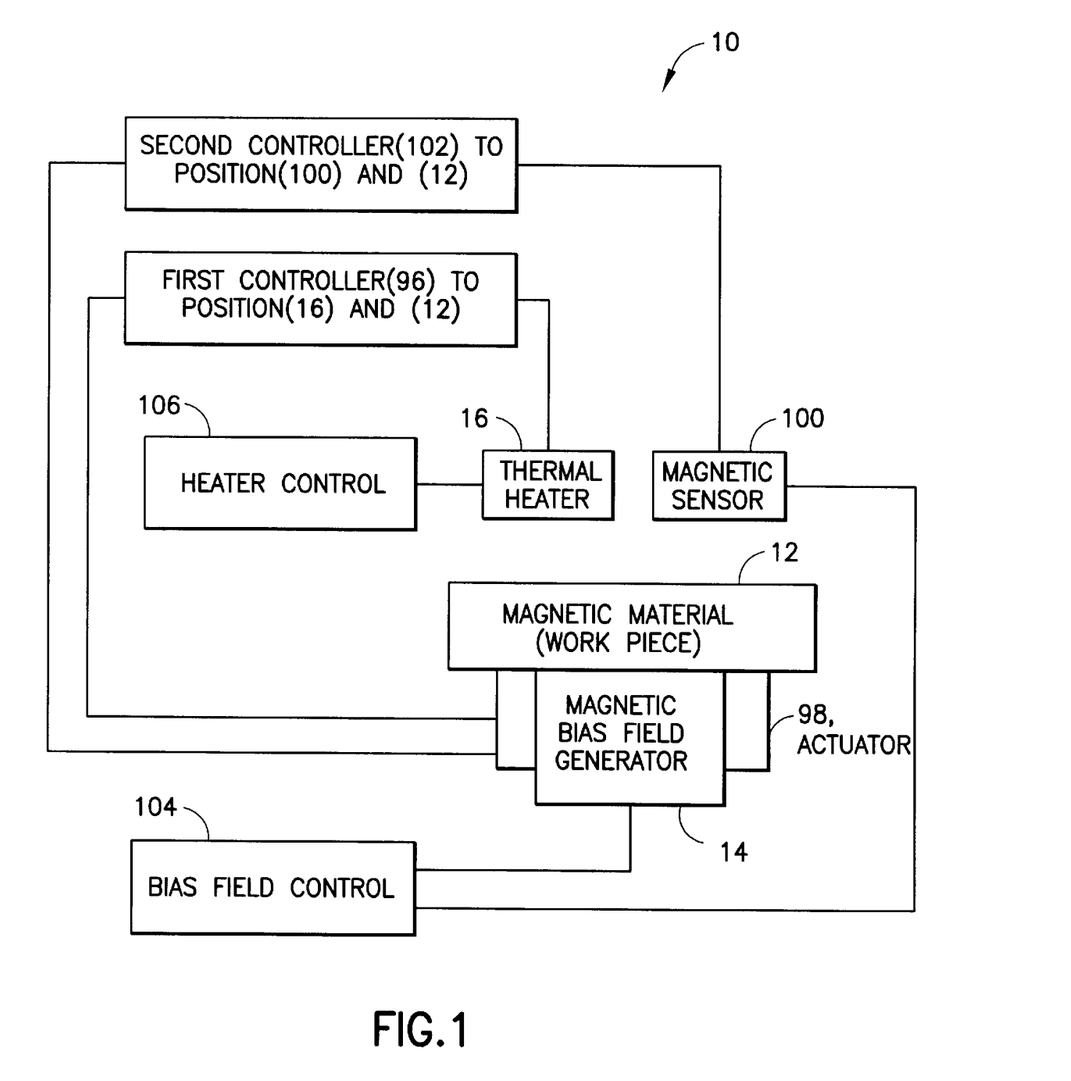
FIG. 1 shows a generalized assembly that can be built in accordance with principles of the present invention.

FIG. 1 shows a generalized assembly (10) constructed in accordance with the invention as summarized above.

In overview, the FIG. 1 assembly (10) can function to write and/or read high density data on a digital recording media (12), for example, a media (12) comprising TbFe, Co/Pt multilayer, FeCoCr etc.

MAGNETIC BIAS FIELD GENERATOR

The FIG. 1 assembly (10) requires a magnetic bias field generator (14) for applying a magnetic bias field on the media (12). A particular media (12) mediates whether there is a horizontal or a vertical magnetic bias field. The field generator (14) may be selected from the group consisting of at least one of an electromagnet and a permanent magnet.

The permanent magnet generally has a stronger field than the electromagnet, and may therefore help obviate deleterious heating effects that may be induced by the electromagnet. The magnetic field generator (14) can apply a local field, or a global field, or a pulsed field; in some specific cases, no bias field at all is needed. Note that the field generator (14) can assist in writing as well as maintaining or stablizing the magnetic spins of surrounding media material.

Thermal Heater

The FIG. 1 assembly (10) requires a thermal heater (16) for generating and directing an incident thermal wave to the media (12). To this end, the assembly (10) may employ a thermal near-field heater, or an atomic force microscope probe (AFM), utilizing an AFM's cantilever as a heating plate and heat sink (see details, below). Alternatively, the thermal heater may comprise a magnetic force microscope (see below). We now discuss these three devices, in turn.

Near-Field Thermal Heater

A suitable near-field thermal heater may comprise two elements: a heating plate that can operate as a heat source; and, a heat sink attached to the heating plate; the heater capable of developing a thermal near-field coupling with the thermo-magnetic media (12).

Attention is now directed to FIGS. 2A–D, which help illustrate the many different geometrical, dimensional, and material configurations which may be suitably adapted for a particular realization of a novel thermal near-field heater.

In overview of the FIGS. 2A–D thermal near-field heaters, it is noted that their purpose is to deposit heat energy to the thermal-magnetic media (12). This energy can be almost any kind; e.g., coherent or non-coherent excitons, plasmons, phonons, photons, etc., and it can be delivered in any mode, e.g., as convective, radiative, or conductive transfer. For example, it can be delivered in any mode from the heat source to the media (12). The heat transfer (see J. B. Xu, K. Läuger, R. Möller, K. Dransfeld, I. H. Wilsom, J. Appl. Phys. 76, 7209 (1994)) is generally diffusive, if the mean free path of molecules $\lambda$ is much less than the distance of the heater to media d. However, if the d<$\lambda$, the molecules in the junction go from the heater to the media without collisions, and transfer the heat in a ballistic manner. In addition, heat can be transferred via propagating radiation according to the Stefan-Boltzmann law. Furthermore, non-propagating waves (near-field) are capable for transferring the heat via a tunneling process when heater and media are very close to each other (near-field region).

Good geometrical conductors for our thermal near-field heater include rectangular or cylindrical design, of the type shown in FIGS. 2, A, B, respectively (numerals 18–28).

For example, the preferred dimensions of $y_1$ and $z_1$ (FIG. 2A) or $r_1$ (FIG. 2B) are informed by the way the thermal energy is to be deposited. For instance, if one uses a focused laser beam to heat up the heating plates (20, 26), $y_1$ and $z_1$ or $r_1$ preferably are larger than the waist of the laser focus (e.g., for a numerical aperture of 0.8 $y_1$, $z_1$, $r_1$>0.8 micrometer). If, on the other hand, one uses a wave-guided laser beam, then the heating plate (20,26), preferably is attached right onto the end of a fiber (maybe via vapor deposition). Therefore, the heating plate (26) preferably has a cylindrical shape, and $r_1$ is determined by the wave-guide size. More specifically, for a single mode fiber in the visible wavelength range, $r_1$ preferably is approximately 3–4 micrometer. If one uses tapered fiber, $r_1$ preferably is larger than or equal $\lambda/2$, where $\lambda$ is the wavelength of the utilized laser light. If, alternatively, one uses resistive heating, then one chooses, most likely, a rectangular shape, and the dimensions are preferably dominated by the connections and the resulting resistance.

In the case of resistive heating, these dimensions can be rather small ($y_1$, $z_1$<0.1 micrometer) if they are made via e-beam lithography. We note that in case of resistive heating, the dimensions as well as the material determine the actual resistance, and hence the heating.

Figure 2A:
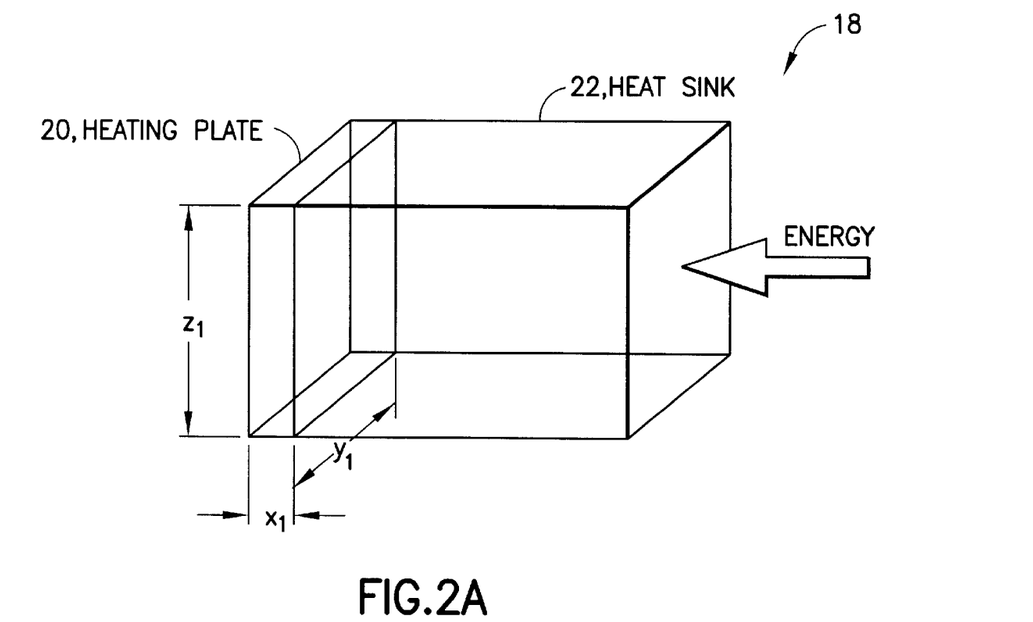
FIGS. 2A–D show alternative embodiments of a near-field thermal heater, with emphasis on its heating plate which can act as a heat source, that may be employed in the FIG. 1 assembly.
Figure 2B:
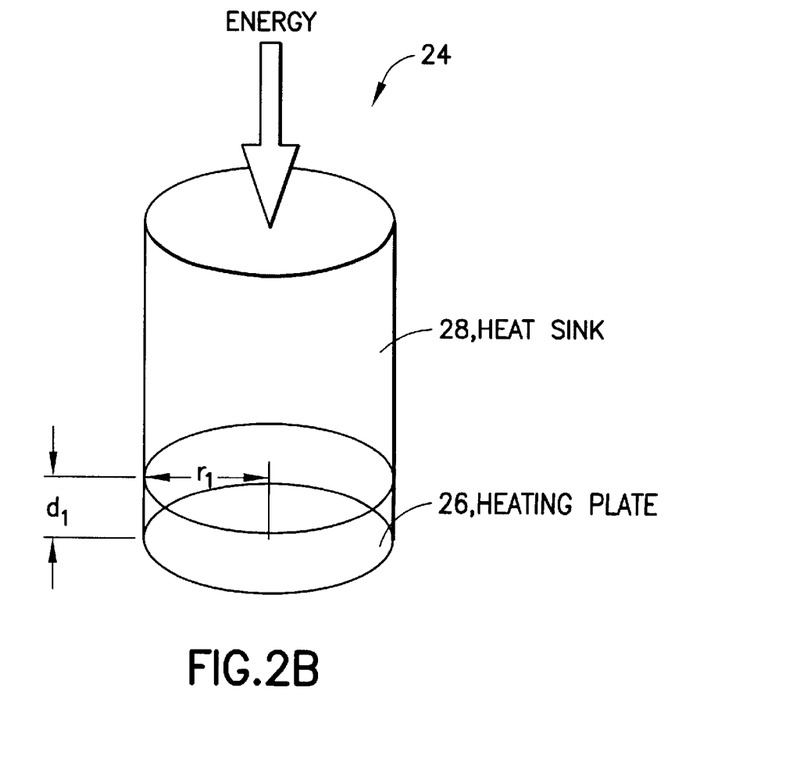

While the $y_1$, $z_1$, $r_1$ dimensions are determined mostly by practical needs, the thickness of the heating plate (20,26) itself should be rather small ($d_1$,$x_1$<0.5 micrometer), for example, if the device is to be used for high speed recording. More specifically, in high speed applications, one preferably uses energy pulses to deposit the heat in the heating plate, so as to subsequently heat up the near-field heat source, e.g., a tip or an edge of the heating plate.

In order to heat up again, the deposited heat (from a last pulse), has to be dissipated. This dissipation is governed by the thermal diffusion length $l=(\kappa \cdot \tau)^{0.5}$, where $\kappa$ is the thermal diffusivity and $\tau$ is the time after the arrival of a heat pulse. Specifically, the heat in a good thermal conductor (approximately $\kappa=2\cdot 10^{-5}$ m$^2$s$^{-1}$) can diffuse a distance of 0.45 micrometer in only 10 ns, corresponding to recording rates of 100 MHz. If one uses a laser beam to deposit the heat, it is noted that the heating plate (20,26) preferably should be at least of the thickness of the skin depth at the laser frequency. Specifically, for a very high absorbing material (e.g., Al) it preferably is larger than 10 nm at 633 nm.

The heating plate (20,26) can be made out of any material, but in general the following requirements preferably exist. (1) The material preferably has a high melting point (T>1100K), generally higher than the temperature, which is necessary for the recording. (2) It preferably has a high thermal diffusivity ($\kappa>1\cdot 10^{-5}$ m$^2$s$^{-1}$, e.g., metals and alloys). (3) The material preferably is high absorbing if a laser is used for the heating (e.g., Cr, Al).

Figure 2C:
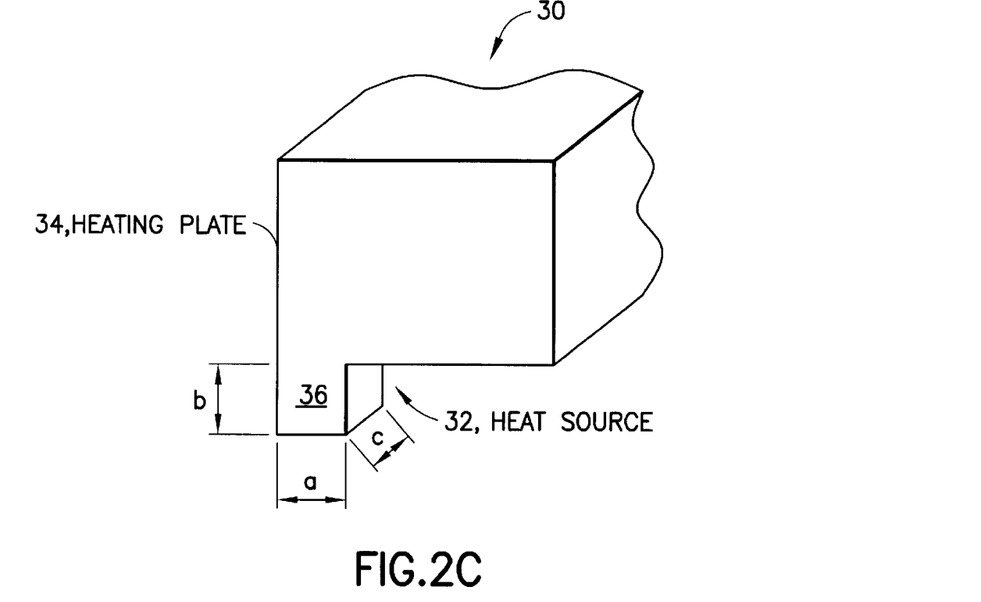
Figure 2D:
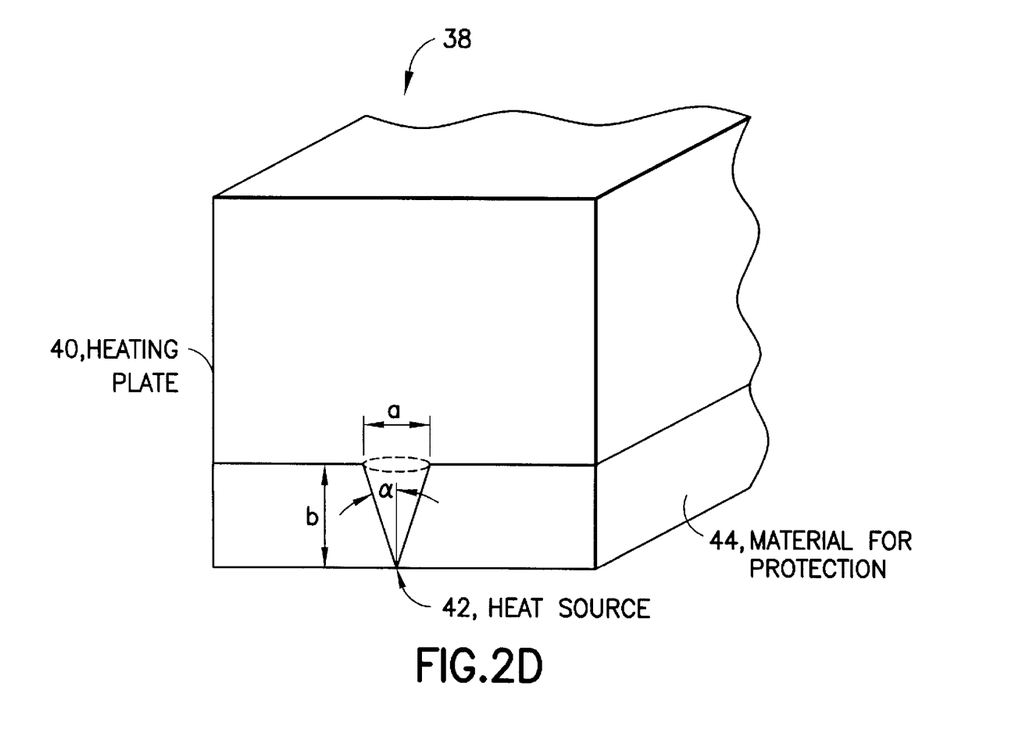

As explained above, a generic purpose of the heat plate operating as a heat source is to guide the thermal energy to the thermo-magnetic media (12). It should be noted that the heating plate is generally hot, and hence generally capable of heating the media. However, such general heating may not always be optimal, since the dimensions of the heating plate may be large, resulting in a large bit. One purpose of the heat source, accordingly, may be to avoid general heating from the heating plate, and to instead focus the thermal energy to a very small point. An attendant and novel property is then to generate a thermal near-field, which can interact very locally, preferably on a nanometer scale, with the media. To this end, the heating plate operating as a heat source can have all kinds of shapes and dimensions. For example, the heat source may be just an edge (36) of a heating plate (34) (FIG. 2C), or a truncated cone (42) of a plate (40) (FIG. 2D). Sometimes, the heat source may be usefully protected by some low heat conducting material (44) (e.g., glass).

Overall, the shape and dimensions of the heating plate operating as a heat source are influenced by the following requirements. (1) For high speed application, a designer preferably chooses shape and dimensions which transfer the heat as fast as possible. In general, that means that a heat source preferably should have a small length b (e.g., b<0.5 micrometer), in order to achieve sufficient heat dissipation within its thermal diffusion length. If one just considers high speed applications, one may be tempted to choose large dimensions of a, c (FIG. 2C) and a, $\alpha$ (FIG. 2D) in order to avoid a slow one-dimensional heat conduction. (2) However, besides high speed, a heat source preferably provides a very local heating, avoiding any stray heat from the heating plate, generally. Accordingly, this correlates with opposite requirements for the dimensions. For a very local heating, preferably choose b large (>0.1 micrometer), and the dimensions a,c small (<0.01 micrometer) (FIG. 2C) as well as a small a and $\alpha$ (a<0.1 micrometer, $\alpha$<15°, FIG. 2D). We note increasing power loss with decreasing dimensions in a,c (FIG. 2C) and a, $\alpha$ (FIG. 2D), which may result in insufficient and very ineffective heating. (3) The shape and dimensions of the heat source are preferably matched to a bit size and a bit pattern. In general, the bits are typically larger or equal to the dimensions of a heat source. Specifically, for a 20 nm bit, preferably work with a heat source of the dimensions a,c<<20 nm (FIG. 2C).

The material of the heating plate can be almost any kind. We note that an edge or tip material is preferably governed by the same general material requirements as that of the heating plate, proper.

We recall from above that our preferred thermal near-field heater includes a second element, namely, a heat sink attached to the heating plate. We now turn our particular attention to this second element.

Figure 3A:
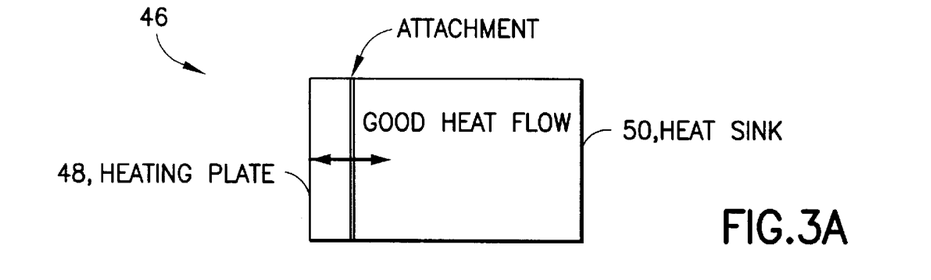
FIGS. 3A–C show alternative embodiments of the FIG. 2 near-field thermal heater, with emphasis on its heat sink.
Figure 3B:
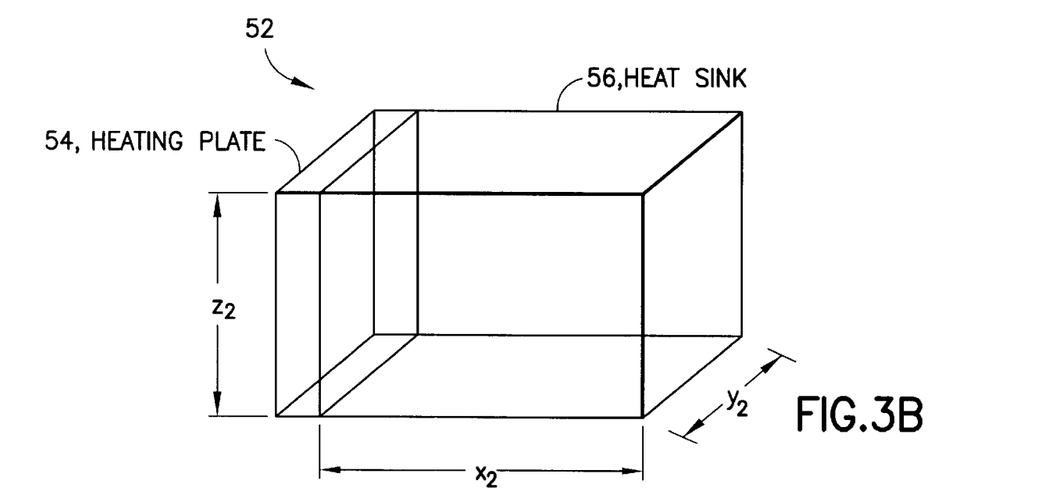

An important purpose of the heat sink is to dissipate deposited heat as fast as possible, in order to get ready for a new heating pulse. Therefore, the heat sink is preferably attached to the heating plate (FIG. 3A, numerals 46–50). This attachment preferably is made in such a way that the heat conduction between heat sink and heating plate is as good as possible ($\kappa$>1·10$^{-5}$ m$^2$ s$^{-1}$) Therefore, it may be very advantageous if the heat sink and the heating plate are made out of the same piece of material. In other cases, the heat sink may be welded, glued, or deposited (via e-beam, vapor, sputtering etc.) right on the heating plate.

Figure 3C:
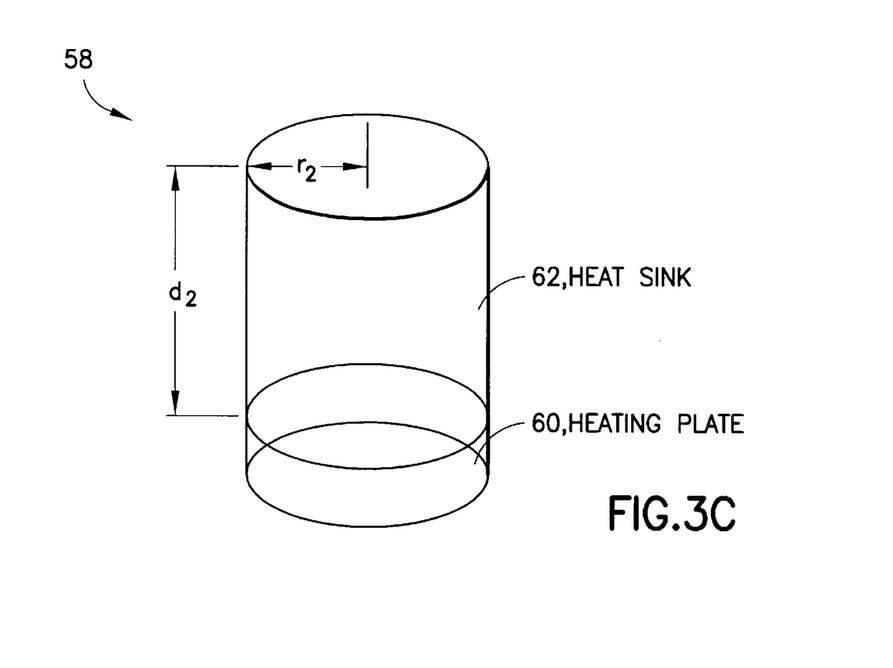

Dimensions and shape for the heat sink are not very critical, so that only guidelines can be given here. In general, the heat sink can have all kinds of shapes. However, in typical cases, it may be rectangular or cylindrical (see FIGS. 3B, C, numerals 52–62). To provide a sufficient heat sink mass, the heat sink preferably is as large as possible. Large dimensions (>1 micrometer) of $y_2$, $z_2$ and $r_2$ may result in a three-dimensional heat flow greatly enhancing the speed for heat dissipation. The dimensions and the shape of the heat sink do not have to necessarily match the dimensions of the attached heating plate. However, in general the heat sink preferably has dimensions larger or equal to the heating plate (e.g., $y_2 \geq y_1$, $z_2 \geq z_1$, $r_2 \geq r_1$). In terms of the thickness of the heat sink, we note that $d_2$ and $x_2$ should preferably be at least the thermal diffusion length l for a given heating repetition rate 1/t. The material of the heat source can be almost any kind. In analogy to the heating plate and the heat tip or edge, the material of the heat sink preferably has a high melting point as well as a high heat conductivity. However, in some cases the material should not be high absorbing at the laser wavelength, if the laser has to be focused on the heating plate through the heat sink material. In such case, preferably use a transparent material, which is still a good heat conductor and has a high melting point (e.g., diamond).

Thermal Near-Field

It is asserted above that the invention advantageously uses the idea of direct thermal coupling between a heater and a magnetic thin film media, and, that this coupling can subsume far-field and/or near-field effects. In particular, near-field effects may include a continuum that may extend from coupling that subsumes at least one portion of the thermal near-field; ranging e.g., from partially inclusive, to substantially or even complete coupling in the thermal near-field. We now provide a working definition, for the purposes of a utility of this invention, of the thermal near-field, a utility of the invention generally captured in the notion that increased storage and speed generally correlate to operation more extensively in the thermal near-field.

Figure 4:
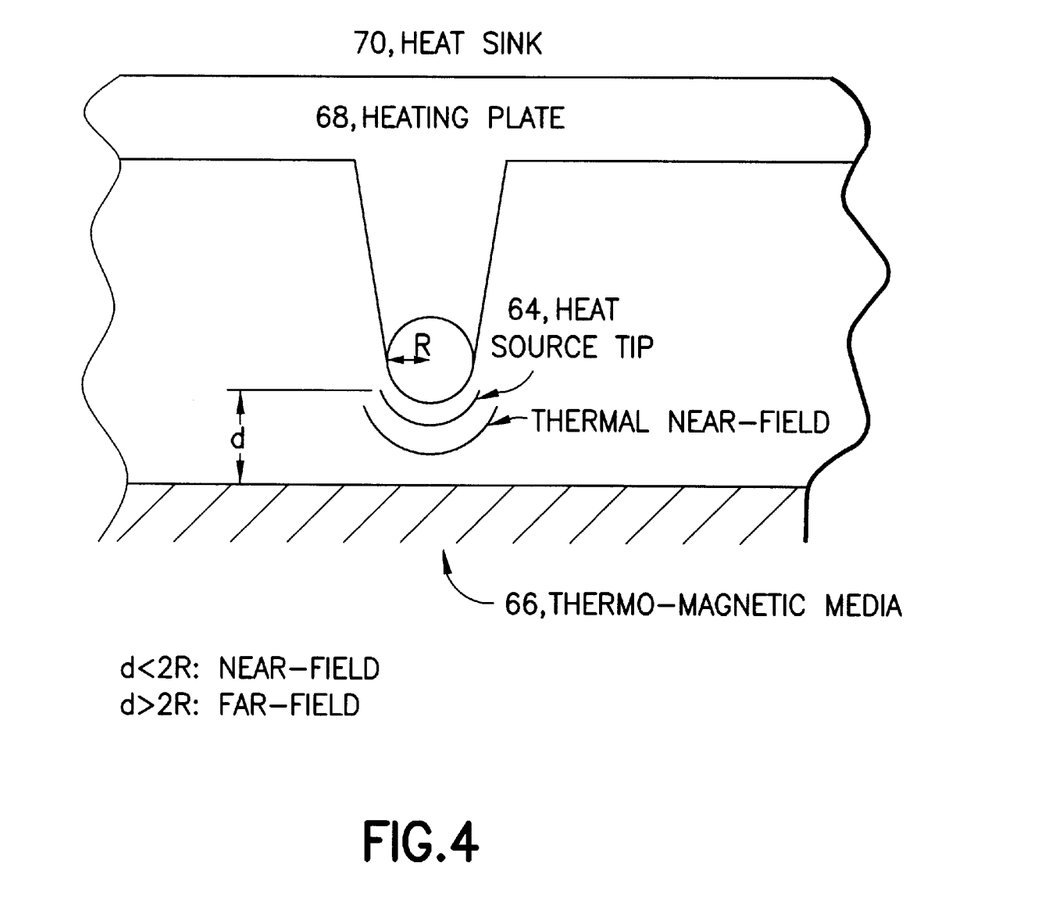
FIG. 4 provides a schematic useful for developing the notion of a near and far-field, as this concept relates to the present invention.

The concept of the thermal near-field is now explained, using an illustrative FIG. 4. Here, a heat source tip (64) interacts via its thermal near-field with a thermo-magnetic media (66). The FIG. 4 heat source tip (64) is spherical at its end with a radius R. For purposes of this invention, the thermal near-field region is the area generally within approximately 2R away from the heat source tip (64). The rest of the area is generally called far-field. We note that in the near-field region, the extent of the thermal energy is generally governed by the source tip dimensions. Therefore, if the heat source tip is brought within approximately 2R to the thermo-magnetic media (66), very local, nanoscale heating of the media can be achieved. A heated area is then determined by the heat source dimensions, rather than the energy or wavelength, which is a basic idea of this aspect of the invention.

In this particular application of heat flow, in the far-field the heat is transferred via diffusion as well as via radiation according to the Stefan-Boltzmann law. In the near-field, a ballistic heat flow, where a gas molecule picks up some energy from the heater and transfers it without collisions to the media, as well as heat conduction via non-propagating waves, are important. We also note that contamination layers on the surface may contribute significantly to the near-field and far-field heat flow.

Heat Supply Systems

Figure 5A:
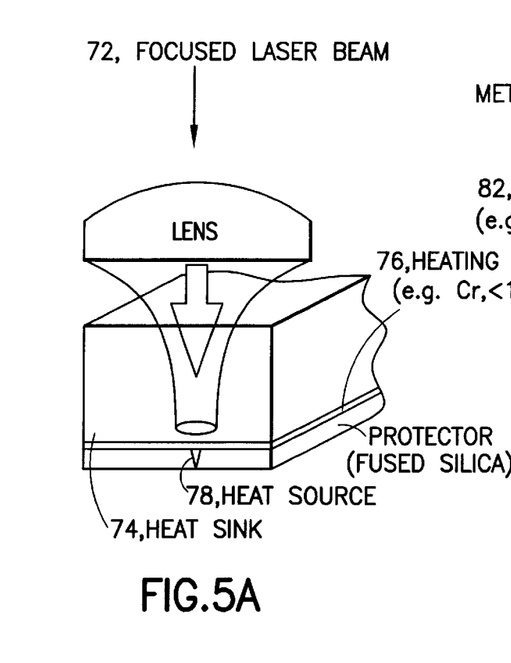
FIGS. 5A–C show illustrative embodiments of mechanisms for depositing thermal energy to the invention's thermal heater.
Figures 5B, 5C:
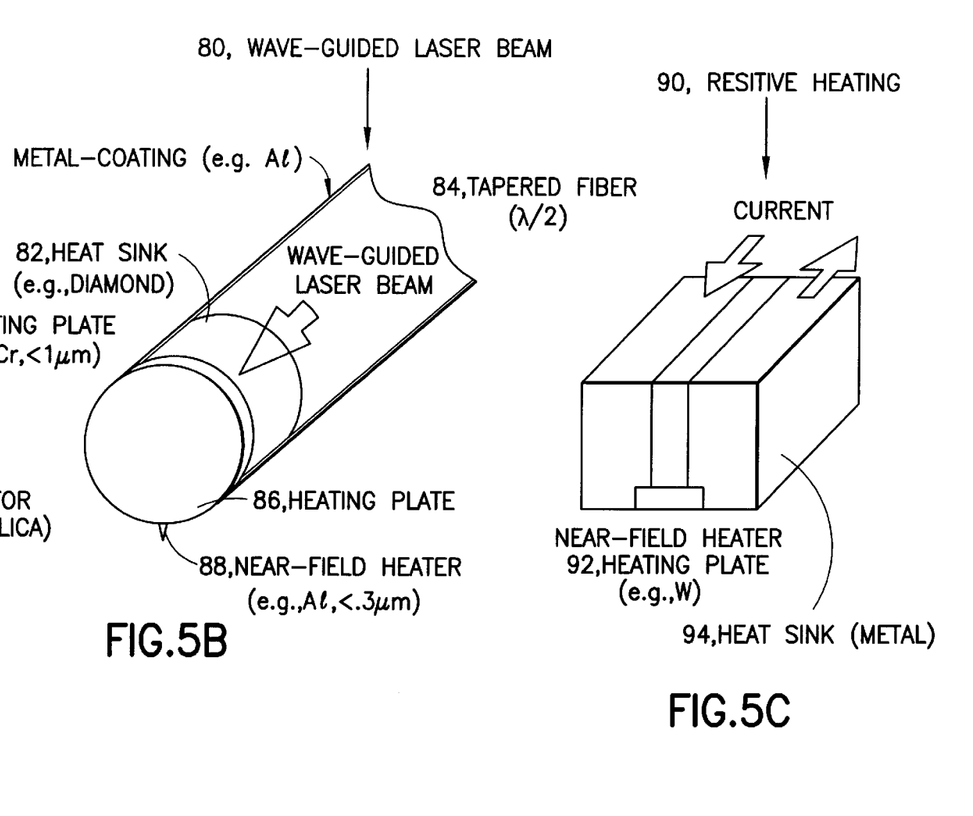

As mentioned earlier, there may be different ways of supplying the thermal energy; examples are illustrated in FIGS. 5A, B, C.

FIG. 5A shows a focused laser beam embodiment (72), wherein laser light is brought through a heat sink (74) onto a heating plate (76). In this case, we prefer the use of diamond as a heat sink material, which is transparent and has an excellent heat conductivity. An alternative material could be Si, if an infrared laser is used. The heating plate (76) can be very thin (0.1 micrometer) if a high absorbing material is used (e.g., Al, Cr.). Directly attached to the heating plate (76) is a heat tip or feature (78), which preferably is short (<0.3 micrometer). The material of the heat tip or feature (78) can be Cr as well or Al. In these cases, the heat tip or feature preferably is protected with a low heat conducting material, such as glass. Simple estimations about the heat flow suggest that such a device can record data with >100 MHz.

FIG. 5B shows an alternative embodiment comprising a wave-guide laser beam (80) used for the heating. In this embodiment, a heat sink (82), which preferably is made out of diamond, may be directly attached to the end of a fiber (84). In other cases, a metal-mating (e.g., Al) of the wave-guide can be used as the heat sink (82). The wave-guide laser beam is absorbed by a thin (<0.1 micrometer) heating plate (86) directly attached to the fiber or heat sink. Again as a material, Cr or Al may be advantageous, which have generally a small skin depth (<0.02 micrometer). A heat source or tip (88) can be an edge or a little probe attached to the heating plate (86). In such a design, the heat source or tip exemplary has a length <0.3 micrometer.

FIG. 5C shows a further alternative embodiment wherein resistive heating (90) may be used to heat up a heating plate (92). As a heat sink (94), the transmission lines could be used, which may be out of a metal such as Cu. The two transmission lines are separated by a non-conducting material, for example, diamond or even glass. Diamond has an advantage, in that it is a very good heat conductor, and can assist the heat sink (94). The two transmission lines are connected via the heating plate (92), which can act as a heating source. The heating plate (92) can be very small, e.g., (<0.05 micrometer). As a material for heating plate and the heat source, tungsten may be very suitable, because of its resistance and high melting point.

Thermal Heater Comprising An AFM Probe or MFM Probe

As asserted above, the FIG. 1 assembly (10) contemplates that the thermal heater (16) may comprise an atomic force microscope probe (AFM). AFM's are generally discussed in U.S. Pat. No. 4,343,993, incorporated by reference herein. For our purposes, the AFM's cantilever can function as heating plate and heat sink. Thus, a laser focused onto the cantilever (heating plate) can be used to heat up the probe. Also, resistive heating with an AFM probe can be used.

In a similar vein, the thermal heater (16) may comprise a magnetic force microscope (MFM) which is sensitive to a magnetic force between its probe and the media. Instruction on MFM's is provided by U.S. Pat. No. 5,308,937, incorporated by reference herein. An advantage of using the MFM probe as a thermal heater is that a local bias field is provided during the writing process, which may help to write magnetic domains. In this case, we note that it is important that the probe not be heated above its Curie-temperature, which otherwise may destroy the magnetic sensor.

First Controller

The FIG. 1 assembly (10) includes a first controller (96) for coordinating a mutual positioning of the incident thermal wave generated by (16) and the media (12) for inducing a direct thermal coupling therebetween. Preferably, the first controller (96) so functions that the coupling subsumes at least one portion of the thermal near-field. A suitable such first controller preferably uses an actuator (98), which actuator (98) may be selected from the group consisting of a piezo-electric actuator, an electro-static actuator, an electromagnetic actuator, a magnetic-strictive actuator, and a thermal-mechanical actuator.

Magnetic Sensor

The FIG. 1 assembly (10) includes a magnetic sensor (100) capable of reading data written on the media (12) with high resolution. The magnetic sensor (100) may comprise magnetic-sensitive sensing, or magnetic-force sensing, or magnetic tunneling junction sensing, or near-field optical sensing, or magnetic induction sensing. An important feature of the present invention is that the magnetic sensor (100) may comprise the same type of element as the thermal heater (16); for example, they may each comprise a magnetic force microscope i.e., an MFM probe may be used as the thermal heater (16).

Second Controller

The FIG. 1 assembly (10) includes a second controller (102) for coordinating a mutual positioning of the magnetic sensor (100) and the media (12). A suitable such second controller (102) preferably uses the actuator (96) which actuator (96), may be selected from the group consisting of a piezo-electric actuator, an electrostatic actuator, an electromagnetic actuator, a magneto-strictive actuator, and a thermal-mechanical actuator.

Other Controllers

The FIG. 1 assembly (10) further includes a controller (104) for enabling bias field control, and a controller (106) for enabling thermal heater control.

In order to control the writing of the magnetic bits, the magnetic bias field and/or the thermal heater have to be controlled precisely. For example, the magnetic bias field of an electromagnet can be simply controlled via the current supplied. If a permanent magnet is utilized, an actuator may be used to change the position of magnet and thus to modulate the field supplied to the media. The thermal heating can be controlled by modulating a laser (e.g., liquid crystal, Bragg cell, current modulation etc.) if a laser is used, or by simply modulating the supplied current if resistive heating is implemented. If a pulsed magnetic bias field and pulsed heating are used, then we note, that in general the pulse of the bias field has to be longer than the heating in order to prevent the written information being erased by the heating.

Implementation/Prototype

Figure 6:
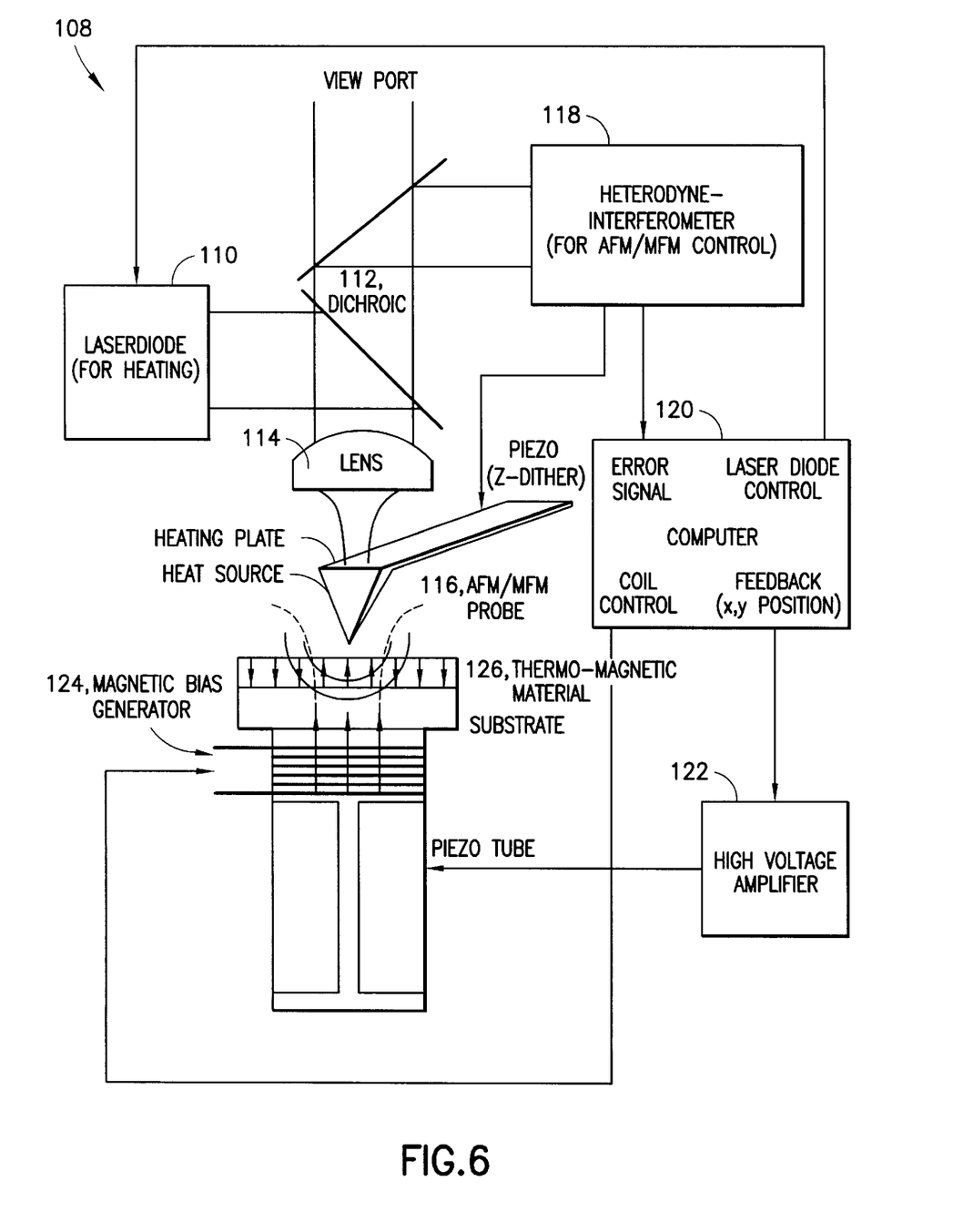
FIG. 6 shows a second assembly in realization of principles of the present invention.

FIG. 6 (numerals 108–126) shows one important prototype of the invention, in the form of an assembly (108) which is capable of testing recording conditions on magnetic materials with high spatial resolution. In this assembly (108), we implement AFM-probes, made out of Si, as a thermal heater. We use a laser diode, which is brought to the lens via a dichroic mirror and focused tightly onto the back of the Si-cantilever heating up the heater. The current of the laser diode (hence the heating) can be modulated via a computer. The AFM-probe is dithered at the cantilever resonance frequency. The amplitude and phase of this oscillation of the cantilever is measured by a heterodyne interferometer, which supplies the error signal to a servo loop, which feeds after amplification in a high voltage amplifier back onto the piezo tube. The media is mounted onto this piezo tube. A little electromagnet is used to supply the bias field to the media. The current of this electromagnet can be modulated by the computer. The x,y positioning of the media is controlled by the computer, as well.

Figure 7:
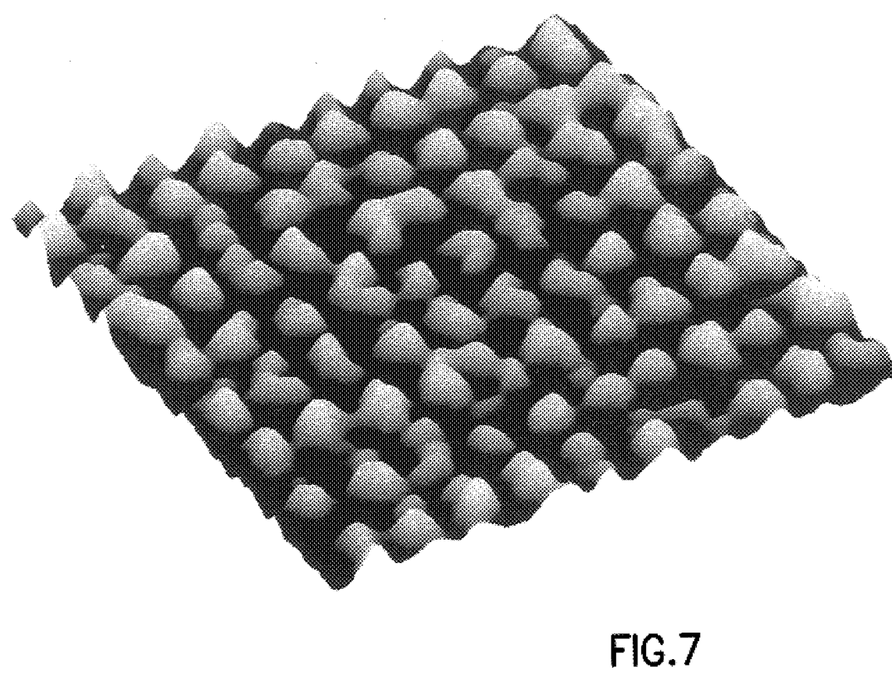
FIG. 7 shows a readout image generated by employment of the FIG. 6 assembly.

For read part, we use magnetic force microscopy in the lift mode. The phase of the cantilever oscillation with respect to the driving phase is monitored while the probe is scanned in constant distance (150Å) over the surface with an open loop. In order to exchange the AFM-probe versus the MFM-probe, we have a viewport implemented so that we are able to position the MFM-probe over the written bit pattern. FIG. 7 shows a test pattern of "1" and "0" written on a Co/Pt multilayer film. The MFM readout image (0.916×0.916 $\mu m^2$) reveals fairly regular bit patterns indicating a data density of 360 Gbit/in$^2$. However, the FIG. 7 shows break up of bits, merging of bits, incomplete writing of bits, etc. which suggest that the media may be inhomogenous at the nanometer scale level.

What is claimed:

1. An assembly for writing/reading high density data on a recording media as a series of tags comprising a magnetic information bit pattern, the assembly comprising:

1) a magnetic bias field generator for applying a magnetic bias field on the media;
   2) a thermal heater for generating and directing an incident thermal wave to the media;
   3) a first controller for coordinating a mutual positioning of the incident thermal wave and the media for inducing a direct thermal coupling therebetween;
   4) a magnetic sensor for reading written data on the media; and
   5) a second controller for coordinating a mutual positioning of the magnetic sensor and the media; the assembly acting as a reader by operating the second controller so that the magnetic sensor is positioned for reading written data on the media; the assembly acting as a writer by operating the first controller and performing at least one of the following actions:
      i) using an information signal for modulating the magnetic bias field;
      ii) using an information signal for modulating the power of the incident thermal wave to the media.

2. An assembly according to claim 1, wherein the magnetic bias field generator comprises an electromagnet.

3. An assembly according to claim 1, wherein the magnetic bias field generator comprises a permanent magnet.

4. An assembly according to claim 1, wherein the magnetic field generator applies a local field.

5. An assembly according to claim 1, wherein the magnetic field generator applies a global field.

6. An assembly according to claim 1, wherein the magnetic field generator applies a pulsed field.

7. An assembly according to claim 1, wherein the thermal heater comprises an atomic force microscope probe.

8. An assembly according to claim 1, wherein the thermal heater comprises a magnetic force microscope.

9. An assembly according to claim 1, wherein the thermal heater comprises:
   1) a heating plate that operates as a heat source; and
   2) a heat sink attached to the heating plate; the thermal heater capable of developing a thermal coupling with the media, wherein at least one portion of the coupling is in a thermal near-field.

10. An assembly according to claim 1, wherein the first controller coordinates the mutual positioning of the incident thermal wave of the media so that they induce a coupling therebetween that subsumes at least one portion of a thermal near-field.

11. An assembly according to claim 1, wherein the first controller uses an actuator comprising a piezo-electric.

12. An assembly according to claim 1, wherein the magnetic sensor comprises magnetic-sensitive sensing.

13. An assembly according to claim 1, wherein the magnetic sensor comprises magnetic-force sensing.

14. An assembly according to claim 1, wherein the magnetic sensor comprises magnetic-tunneling junction sensing.

15. An assembly according to claim 1, wherein the magnetic sensor comprises near-field optical sensing.

16. An assembly according to claim 1, wherein the magnetic sensor comprises magnetic induction sensing.

17. An assembly according to claim 1, wherein the magnetic sensor and the thermal heater each comprise a magnetic force microscope.

18. An assembly according to claim 17, wherein both elements comprise a magnetic force microscope.

19. An assembly according to claim 1, wherein the second controller uses an actuator comprising a piezo-electric.

* * * * *